Patented Feb. 10, 1948

2,435,852

UNITED STATES PATENT OFFICE 2,435,852

FLUX FOR USE IN ARC WELDING

Leonidas K. Stringham, University Heights, Ohio, assignor to The Lincoln Electric Company, Cleveland, Ohio, a corporation of Ohio No Drawing. Application June 3, 1942, Serial No. 445,657

2 Claims. (Cl. 148—26)

This invention relates as indicated to a method of and materials for use in arc welding. More particularly this invention is concerned with the provision of an improved flux which may be placed on the work so that during the welding operation, the flux is melted and provides a protective blanket over the pool of molten metal.

The art of using fluxes which float on top of a molten metal for the purpose of protecting the metal from the air, and at the same time "cleaning up" the metal at least to a certain extent, is as old as the art of melting iron. Basically the same problems which are encountered in an electric furnace are also present in the small pool of molten metal which is formed by means of the electric arc.

There are, however, a number of particular problems which arise in arc welding which, for various reasons, are not present in the art of steel manufacture, i. e. in the electric furnace. For example, the pool, i. e. the body of molten metal, is considerably smaller in the arc welding operation. The length of time during which the metal is maintained in the molten state is likewise considerably shorter in the arc welding operation.

While it will thus be seen that fundamentally the same basic problem, i. e. that of protecting the weld metal from the atmosphere, is present in both arc welding as well as steel manufacture, nevertheless, the particular conditions such as those pointed out above which attend the welding operation require that the flux used in conjunction with it be somewhat different than and capable of performing functions not required of the conventional steel mill flux.

It is also true, however, that great care must be exercised in the selection of the materials which enter into the arc welding flux since the extremely high temperatures encountered in the arc and the violent agitation of the weld metal usually accomplished by the arc will, in many cases, cause a reaction between the flux and the metal to the detriment of the metal. Thus the metal may dissolve components from the flux and be adversely affected, or conversely, the flux may dissolve components out of the metal to the detriment of the metal.

The arc welding operation is usually performed on metal parts which have been previously partially fabricated, so that a substantial amount of foreign material in the nature of moisture, metal oxides, etc., are present on the work where the pool of weld metal is to be formed. Since these foreign substances are generally reactive in their nature, and especially at the temperature of the arc, they have a strong tendency to cause either a disruption of the arc, or more frequently, a deterioration of the weld metal by generating quantities of gas which are trapped upon the rapid freezing of the weld metal in contact with the parent metal resulting in the occurrence of blow holes and the like in the weld bead. The elimination of the undesirable effects of such foreign substances is also a highly desirable function of a welding flux.

In the welding of most steels, the intense heat of the arc may have a tendency to deplete certain of the alloying agents present in the steel, this being particularly true with regard to the minor amounts of manganese which are present in many grades of commercial steels. Other alloying agents, such as nickel and cobalt, are likewise present in certain alloying steels, and they may similarly be depleted by the welding operation unless some means is provided for replenishing the same.

On the other hand, it is desirable for many purposes that the weld metal be richer in one or more alloying agents than is the parent metal joined by the weld metal or on which the weld metal is deposited.

Inasmuch as the flux compositions of my invention are admirably suited for the purpose of supplying to the weld metal minor amounts of alloying elements, such as for example, manganese, nickel, and cobalt, the flux compositions hereinafter more particularly defined are admirably suited for the purpose of either insuring against depletion of alloying elements in the weld metal, or for the purpose of enriching the weld metal in one or more of such elements.

It is a principal object of my invention, therefore, to provide a welding flux which may be deposited on the work and melted down by the arc to provide a protective layer over the pool of weld metal, and at the same time, incidentally perform all of the other functions and meet all of the other requirements as above pointed out.

Other objects of my invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, this invention comprises the discovery of a flux for arc welding purposes which is particularly suited for use in the so-called heavy flux welding process, as hereinafter more particularly defined, and characterized by a melting point range and composition such as to adequately protect the metal without detrimentally reacting therewith, and at the same time, however, providing a means for eliminating the detrimental effects of the foreign materials aforesaid.

Before I proceed with a detailed statement of the composition of specific embodiments of my invention, it will be desirable to review briefly certain general phases of the problem of manufacturing and utilizing an arc welding flux.

In the first place, the requirements of the electric arc for the reasons aforesaid are so complex that a flux can generally not be provided by using a single substance or compound. It is generally necessary to provide a combination of materials or components each designed to and capable of performing a particular function.

There are two general ways of providing such a mixture. It is a further problem that the materials generally required for the best flux mixture usually have widely different specific gravities so that if the necessary components were merely ground and mechanically admixed, they would tend to separate or settle out during the course of shipment and handling, resulting in a non-homogeneous mixture at the point of use. It is also true that certain of these components are reactive with each other.

One way of avoiding these problems is to carefully grind and admix the components which enter into the flux, and then, while in such carefully admixed state, to fuse them at an elevated temperature, thus accomplishing two purposes. In the first place, most of the preliminary reactions between the flux components are permitted to take place so that such reactions will not be taking place concurrently with the welding operation. In the second place, by preliminarily fusing the flux, this may be done under carefully controlled conditions, and a perfectly homogeneous melt produced. By cooling, solidifying, and then grinding such melt, each particle or granule of the flux will have represented therein the proper balance between all of the flux components.

My invention relates to a flux of the character which may thus be advantageously preliminarily fused, and after fusion then cooled to solidification and then ground to such fineness as is most desirable for use on the work.

It may be well to point out, at this place, that the flux comprising my invention is particularly suited for use in the so-called dual arc process which comprises the subject matter of copending application, Serial No. 399,984, filed by George G. Landis and myself as joint inventors on June 27, 1941, now Patent No. 2,320,824, dated July 1, 1943.

This dual arc process is characterized by the fact that two arcs operate in succession on the weld metal. This means that the weld metal is maintained in a molten state for a period of time usually longer than when the welding operation is performed by the use of only a single electrode, and it may also be possible that the entire body of molten metal may be heated to a higher ultimate temperature in the dual arc process than when only a single electrode is employed.

While the flux of my invention is of general utility, it is, nevertheless, particularly suited for use in the above described dual arc process, and it is believed that among the reasons for this are the following:

(1) In certain of the compositions, a material having the effect of a deoxidizer is provided, and as more particularly pointed out hereinafter, such deoxidizer is, for the reasons to be explained, different from conventional deoxidizers, such as ferromanganese and the like which have been previously used for this purpose.

(2) The flux has a sufficiently high melting point, i. e., closely approaching the melting point of the metal itself, so as to be fusible in that range wherein its fluid state is most essential to a proper protection of the weld metal.

(3) Its composition is such that even under the prolonged period of the dual arc process aforesaid, during which the weld metal is subjected to the arc, there will be neither a depletion of the essential components of the weld metal, such as for example manganese, nor will there be a contamination of the weld metal by too much of certain elements such as silicon which, if present in too great an amount, leads to embrittlement of the weld metal.

As previously indicated, the flux of my invention is of the type which is pre-smelted. The following is a specific example of a raw batch in per cent by weight which may be smelted in the production of a successful flux in accordance with my invention.

*Table I*

| | Per cent by weight |
|---|---|
| Silica sand | 38 |
| Quicklime (85% CaO, 15% MgO) | 18 |
| Aluminum oxide | 26 |
| Maganese dioxide | 9 |
| Cryolite $Na_3AlF_6$ | 9 |
| | 100 |

The foregoing raw batch, after fusion and fritting in a water bath in the manner customary in the manufacture of porcelain enamel, yielded a smelt of approximately the following composition:

*Table II*

| | Per cent by weight |
|---|---|
| $SiO_2$ | 41.12 |
| CaO | 13.06 |
| MgO | 2.69 |
| $Al_2O_3$ | 26.53 |
| MnO | 10.30 |
| $Na_3AlF_6$ (based on $F_2$) | 5.22 |
| FeO | .9 |
| $CO_2$ | .15 |

The following is a table giving ranges of percentages of the raw batch mixture for fusion which have been explored, and in which field many satisfactory fluxes were produced:

*Table III*

| | Per cent by weight |
|---|---|
| Silica sand | 34–50 |
| Quicklime (85% CaO, 15% MgO) | 15–35 |
| Aluminum oxide | 2–30 |
| Manganese dioxide | 0–25 |
| Cryolite $Na_3AlF_6$ | 0–10 |

It will be observed that the range of compositions given in Table III above includes a number of compositions in which manganese dioxide and cryolite may be absent. Since generally best results may be secured by the use of manganese dioxide, the following is given as a range of percentages of flux components characterized by the presence in each instance of a substantial amount of manganese dioxide:

Table IV

| | Per cent by weight |
|---|---|
| CaO | 5–24 |
| $SiO_2$ | 25–50 |
| $Al_2O_3$ | 9–40 |
| $MnO_2$ | 3–20 |

A further range of compositions which has been explored and characterized by the additional presence therein of cryolite is given in the following table of flux components:

Table V

| | Per cent by weight |
|---|---|
| CaO | 18–24 |
| $SiO_2$ | 35–50 |
| MgO | 2–10 |
| $Al_2O_3$ | 15–30 |
| MnO | 10–20 |
| Cryolite $Na_3AlF_6$ | 5–15 |

The foregoing compositions are capable of providing fluxes which satisfy the three requirements previously identified, namely, (1) The provision of a component serving as a deoxidizer or alloying agent;

(2) A melting point range best suited for the desired purpose; and (3) A composition which will neither deplete components such as the manganese content of steel while, at the same time, not contaminating the weld metal by undesirable components such as an excess of silicon.

It is appreciated that no one may define exactly the precise effect or mode of operation of the several components of the flux under the arc because of the extremely high temperatures encountered, and the fact that any reactions which do take place at that temperature are extremely difficult to verify by known means.

While I, therefore, do not wish to be committed to any particular mode or theory of operation of my improved flux, it nevertheless appears, from a large number of results which have been closely studied, that an explanation such as the following may be offered for the mode of operation of the various components of my flux, as well as a comparison of the same with fluxes of the prior art.

The manganese oxide component is believed to function as a deoxidizer or an alloying agent. This is not a material which is generally recognized as a deoxidizer. However, it must be remembered that there is a possibility of its reacting with other components in the smelt during the preliminary fusion and a further breakdown or reaction with other materials in the arc. The results which I have been able to achieve would indicate, however, that it, or derivatives of it, attributable to its addition to the flux, produces a strong deoxidizing effect so that by the utilization of my flux it is permissible that there be moisture, mill scale, other metallic oxides, etc., present on the work and it is still possible to produce an entirely sound weld.

At this point it may be desirable to mention that the customarily used deoxidizers are not suitable in a fused flux of this character since they are usually metallic in nature and, in the flux bath, settle out resulting in a non-homogeneous smelt. If an effort is made to incorporate such conventional deoxidizers as ferro manganese after smelting by grinding the same with the smelted and fritted flux, the specific gravity of the deoxidizer is sufficiently different from the smelted component of the flux so that there is also a tendency for a mechanical separation to take place during shipping and handling. The manganese dioxide, however, apparently combines with the remaining components of the smelt in the production of an entirely homogeneous mass.

On the second point, namely, the provision of a flux having the desired melting point range best suited for the arc welding operation, particularly the dual arc process above identified, this is controlled in the compositions of my invention by maintaining the aluminum oxide content within the ranges specified. It thus becomes essential for most purposes to maintain the aluminum oxide content within the ranges given, in order that the flux have a melting point such that it is at or slightly below the melting point of the weld metal.

On the third point, namely, a control over the composition of the flux such that it neither depletes the desirable components of the weld metal, nor contaminates the same, this is attributable in my composition to a careful control over the $SiO_2$ content of the flux, as well as the presence therein of a substantial amount of manganese dioxide. By a very careful control over the amount of manganese dioxide used, it is possible to supply a sufficient amount of manganese in the slag so as to counter-balance the normal depletion of manganese from the weld metal.

Generally, it is desirable to not change the manganese content of the weld metal. However, since weld metals vary in manganese content, it is generally safer to include enough manganese dioxide in the slag so that not only is depletion of manganese from the weld metal prevented, but actually there will be a small increase in the manganese content. Since it is generally safer to produce a slight increase in the manganese content than to permit a depletion of the same, the flux compositions given above are such as to generally supply a slight additional amount of manganese to the weld metal.

Of perhaps even greater importance is the control over the amount of silicon in the weld metal. On this point, it is well known that too great an amount of silicon leads to detrimental embrittlement of the weld metal, and it is, therefore, rather critical that the silicon content of the flux be such that even under the prolonged heating and high temperature of the dual arc process aforesaid, the flux will not result in a substantial increase in the silicon content of the weld. It is for this reason that a rather careful control over the silicon content of the flux is maintained, and it will be observed that all of the fluxes given above utilizes silica content of less than 50%.

The fluxes comprising my invention are generally used by placing the same in the form of a powder or in granular form in a windrow on the line to be welded in advance of the electrode. The thickness to which the flux is deposited varies with conditions. Generally, best results will be secured by having the flux layer thick enough so that the electrode by which the welding arc is maintained actually projects into the flux layer. Even though the electrode does project into the flux layer, an actual arc is formed when using the flux of my invention. The occurrence of an actual arc may be determined and verified by a careful observance of the electrical characteristics of the welding circuit, and a study of such characteristics has shown that when a flux, in accordance with my invention, is employed even to a thickness such as to completely surround the end of the electrode, nevertheless, an actual arc is maintained.

The flux of my invention is capable of use with carbon as well as metallic electrodes, and at this point it may be well to point out that to my knowledge the flux of my invention is the first available for use in conjunction with a carbon electrode in such a thickness that the end of the carbon electrode actually projects into the flux bed. All other fluxes previously available have had numerous objections which made their commercial use with the carbon electrode, and in the thicknesses specified, impractical and not feasible.

I also believe it to be broadly new to provide a material, such as the manganese dioxide, which may be fused with the remaining fusible components of the flux and which serves as a deoxidizer material. No other fluxes with which I am familiar has fused therein a substance capable of performing the same function. It is for this reason that all deep bed fluxing operations of the prior art utilizing a fused flux have required for successful operation that the work pieces to be welded be thoroughly cleaned and dried before the welding operation is attained. Since by the utilization of my flux it is not necessary to thus carefully clean and dry the work, this results in a great saving in the welding operation.

Throughout the foregoing description of the flux compositions characterizing this invention, I have referred particularly to the use of manganese oxide, and in thus referring to the same, have characterized it as capable of performing the dual function of a deoxidizer and alloying agent. While, as previously indicated, there may be some question as to the precise theory of operation of this material, it is believed that it is capable of functioning in the dual capacity stated, for reasons which may be summarized as follows:

I wish to point out, in the first place, that because of the addition of manganese oxide to the melt, manganese oxide is not necessarily present in the resultant pre-fused slag. By this I mean that the manganese oxide in the melt, or at least a part thereof, may be converted to the silicate, leaving some manganese oxide, depending upon the conditions under which the smelt is prepared, and on the other hand, all of the manganese oxide may be converted to the silicate.

There is evidence that a certain amount of the manganese becomes disassociated and actually goes into solution, although it is my assumption that only a small amount of the manganese goes into true solution as such. It has been demonstrated, however that the manganese, whether in the disassociated form or in the form of a compound thereof such as the oxide or silicate is homogeneously dispersed throughout the resultant pre-fused flux. Since there have been definite indications that the presence of manganese results in a deoxidizing effect in the arc welding operation, I do not wish to be bound by any theory in explanation of that effect.

It has also been found that the inclusion of the manganese oxide in the melt results in a manganese enrichment of the resultant weld metal formed when the pre-fused flux is used. Depending upon the amount of manganese present in the flux, this enrichment may be a mere replacement of the amount of manganese which would be otherwise depleted, or if the amount of manganese in the flux is sufficiently high, as for example some of the higher concentrations given in the foregoing specific examples, the manganese content of the weld metal may be higher than the starting parent metal.

Inasmuch as this control over the manganese as well as other alloying element content of the weld metal is an important feature of most welding operations, that aspect of the present invention is of extreme importance. The manganese may be made available for this purpose by including in the melt, preferably by including the same in the raw mix before smelting, other compounds of manganese such as the oxides, carbonates, silicates, fluorides, and hydroxides. Manganese fluosilicate will be found useful for this purpose in addition to the derivatives above named.

My invention is not limited to the utilization of compounds of manganese in the slag for the stated purposes, but instead, any metallic compound which is capable of forming a homogeneous resultant fused slag may be used. Thus, for example, the oxides, carbonates, silicates, fluorides, and hydroxides of nickel and cobalt may similarly be used to advantage.

Other modes of applying the principle of the invention may be employed, change being made as regards the details described, provided the features stated in any of the following claims or the equivalent of such be employed.

I, therefore, particularly point out and distinctly claim as my invention:

1. An arc welding flux of the character which may be produced by a fusion of the following components in about the percentages given:

| | |
|---|---|
| Silica sand | 38 |
| Quicklime (85% CaO, 15% MgO) | 18 |
| Aluminum oxide | 26 |
| Oxide of manganese | 9 |
| Cryolite $Na_3AlF_6$ | 9 |
| | 100 |

2. A pre-fused flux for arc welding purposes having approximately the following composition:

| | |
|---|---|
| $SiO_2$ | 41.12 |
| CaO | 13.06 |
| MgO | 2.69 |
| $Al_2O_3$ | 26.53 |
| MnO | 10.30 |
| $Na_3AlF_6$ (based on $F_2$) | 5.22 |
| FeO | .9 |
| $CO_2$ | .15 |

LEONIDAS K. STRINGHAM.

REFERENCES CITED

The following references are of record in the file of this patent:

UNITED STATES PATENTS

| Number | Name | Date |
|---|---|---|
| 597,112 | Gooch | Jan. 11, 1898 |
| 2,043,960 | Jones et al. | June 9, 1936 |
| 2,141,929 | Moritz | Dec. 27, 1938 |
| 2,191,473 | Blumberg | Feb. 27, 1940 |
| 2,194,200 | Cohn | Mar. 19, 1940 |
| 2,200,737 | Clapp | May 14, 1940 |
| 2,228,639 | Miller | Jan. 14, 1941 |
| 2,258,675 | Cohn | Oct. 14, 1941 |
| 2,308,194 | Miller | Jan. 12, 1943 |